United States Patent [19]

Crespy et al.

[11] 4,132,606
[45] Jan. 2, 1979

[54] PROCESS FOR THE MANUFACTURE OF ELECTRODES

[75] Inventors: Guy Crespy; Pierre Matthey, both of Geneva, Switzerland; Manfred A. Gutjahr, Wendlingen, Germany

[73] Assignee: Daimler-Benz Aktiengesellschaft Stuttgart-Untertuerkheim, Stuttgart, Germany

[21] Appl. No.: 855,337

[22] Filed: Nov. 28, 1977

[30] Foreign Application Priority Data

Nov. 27, 1976 [DE] Fed. Rep. of Germany ....... 2653984

[51] Int. Cl.$^2$ .......................... C25D 9/04; C25D 9/08
[52] U.S. Cl. .................................. 204/2.1; 204/56 R
[58] Field of Search ................... 204/2.1, 24, 56 R, 96

[56] References Cited

U.S. PATENT DOCUMENTS

| 3,214,355 | 10/1965 | Kandler | 204/56 R |
|---|---|---|---|
| 3,335,033 | 8/1967 | Kober | 204/56 R |
| 3,484,346 | 12/1969 | Bulan et al. | 204/56 R |
| 3,507,699 | 4/1970 | Pell et al. | 204/2.1 |

Primary Examiner—T. M. Tufariello
Attorney, Agent, or Firm—Brumbaugh, Graves, Donohue & Raymond

[57] ABSTRACT

A process for the manufacture of electrodes suitable for electrolytic cells which comprises impregnating a porous matrix structure consisting of an electrode metal with an oxide or hydroxide of the metal by galvanic activation in a bath containing a salt of the metal, in neutral to acid solution, in which at least two porous metal matrix electrodes are placed into the bath and both are impregnated at the same time by applying one terminal of a direct voltage to each electrode and reversing the polarity of the direct voltage at a pulsating frequency. The invention is particularly applicable to the production of positive nickel electrodes.

30 Claims, No Drawings

PROCESS FOR THE MANUFACTURE OF ELECTRODES

This invention relates to a process for the manufacture of electrodes suitable for electrolytic cells, in particular positive nickel electrodes, in which a porous matrix consisting of an electrode metal is impregnated with an oxide or hydroxide of the metal by galvanic activation in a bath containing a salt of the metal, in particular its nitrate, in neutral to acid solution.

Various processes for the activating impregnation of nickel electrodes having a porous nickel structure have already been described in German Offenlegungsschrift No. 2,427,422. In one method, the nickel matrix electrode is cathodically polarized at 40° C in an electrolytic bath consisting of an aqueous solution of 200 g of nickel nitrate with an addition of 20 g of nickel hydroxide per liter of water. The electrolytic bath was maintained at pH 5 to 7 and electrolysis was carried out at a current density of 0.05 A/cm$^2$ for 1 to 2 hours.

There has also been described a process for the impregnation of sintered nickel electrodes, in which electrolytic impregnation was carried out at higher current densities, at temperatures in the region of 85 to 95° C, at a higher nickel nitrate concentration and with an addition of up to about 10% of cobalt nitrate. A positive electrode with advantageous properties is obtained from both methods. However, the necessity to use sacrificial electrodes of nickel is somewhat unsatisfactory, and the loss of nickel from the sacrificial electrodes is generally greater than the deposition of nickel hydroxide on the nickel electrode to be impregnated. This frequently leads to pH shifts and to shifts of concentration in the composition of the bath, in particular to an accumulation of nickel in the bath. Maintaining the composition of the bath constant therefore requires a certain effort.

It is an object of the present invention to provide a process for the electrolytic impregnation of porous metal electrodes, in particular nickel electrodes, which results in good quality matrix electrodes impregnated with the oxide or hydroxide of the metal and which can be carried out economically.

The invention is characterized in that at least two porous metal matrix electrodes are placed in the bath and both impregnated at the same time by connecting one terminal of a direct voltage to each electrode and reversing the polarity of the direct current at pulsating intervals.

The fundamental difference of the new process from the known or proposed processes is that it dispenses with the sacrificial electrode, and one electrode is always connected as cathode and another electrode as anode and there is a constant change between cathode and anode by reversal of the direct current. Instead of only one electrode, as before, two electrodes are now impregnated under the same conditions but without the sacrificial electrode. In addition, the new process has the advantage that any substantial increase in the nickel concentration of the bath during electrolysis, which occurred in previous processes, can now be avoided. Hypersaturation of the bath with metal salt is also avoided. It is therefore easier now to keep the composition of the bath constant, and in most cases correction of the nickel concentration is not even necessary. So long as an electrode is connected as cathode, impregnation with metal oxide or hydroxide takes place in the same way as before due to reduction of nitrate and consequent localized increase in the pH. If the electrode is then connected as anode, a certain amount of metal is carried away from the electrode which is to be impregnated, but this loss of metal is kept within bounds because it is possible to ensure by having a suitable bath composition that the loss of metal is accompanied by a discharge of oxygen. The metal which is removed can immediately be incorporated in the electrode again as metal oxide or hydroxide. The matrix electrodes used for impregnation therefore preferably have a higher metal content than is desired for the finished electrode. The excess can then be converted into active mass.

Reversal of the direct current is preferably carried out at least every 3 minutes, and shorter intervals are preferred. As a rule, the polarity is reversed every 4 to 45 seconds, and currentless times between two reversals are preferably avoided. The polarity reversals are advantageously carried out in symmetric time intervals so that each electrode is connected for the same total length of time as cathode and as anode.

The individual conditions of electrolysis may be varied within certain limits depending on the composition of the bath and on the current density and the pH. High current densities may be employed if the pH is maintained substantially at neutral and conversely, a somewhat lower current density is preferred at a more acid pH in order to prevent excessive corrosion of whichever electrode is connected as anode.

The process according to the invention is particularly suitable for the manufacture of positive nickel electrodes by the impregnation of porous nickel matrix electrodes with nickel hydroxide in an electrolytic bath containing nickel nitrate and optionally cobalt nitrate in a weak nitric acid solution. However, other positive electrodes, e.g., silver electrodes, as well as negative electrodes such as cadmium, iron, cobalt and zinc electrodes, may also be manufactured by the process. The following description of the process is given with reference to the manufacture of nickel electrodes as the preferred field of application.

Numerous additives may be introduced into the bath both to influence the composition of the active mass and to influence the conditions of electrolysis. Cobalt nitrate, for example, may be added in quantities of up to 10%, based on the nickel nitrate. Magnesium nitrate and lithium nitrate may also be added to the bath in small quantities. Depassivating ions may also be added to the bath, for example halides, possibly in the form of 1 to 5 g/liter of potassium chloride. Sulphate and persulphate ions also have a depassivating effect. When such depassivating ions are used, it is advisable to keep the period of pulsation brief. Reversal of polarity may then be carried out every 5 to 10 seconds. Hydrogen peroxide has a positive action on the deposition of nickel hydroxide and to some extent oxidizes $Ni^{2+}$ to $Ni^{3+}$, as can be recognized by a darkening of the color of the electrolytic bath.

After the electrolytic impregnation, the nickel electrodes may, if necessary, be neutralized and may then be additionally activated with an ammonium persulphate solution. This additional activation may be effected by, for example, dipping the electrode for 1 hour into an approximately 2 molar ammonium persulphate solution at room temperature.

The metal matrix electrodes which contain a high proportion of pores may be produced by various known methods, for example by the procedures described in German Offenlegungsschrift No. 2,427,422. Porous sintered electrodes produced by pyrolysis of a metal-containing plastics foam followed by sintering of the metal particles to produce a sintered structure are particularly suitable since introduction of metal powder into the preliminary product for the production of a plastics foam provides the possibility of widely varying the metal content of the foam and thereby also influencing the structure of the matrix and its porosity. The matrix can thereby be adjusted to the conditions found to be most suitable for the impregnation by the process according to the invention.

Further features of the invention will appear from the following examples which are given by way of illustration only.

EXAMPLE 1

Two sintered nickel electrodes 8 mm in thickness consisting of sintered nickel powder and having a pore content of 85% were dipped into an electrolytic bath containing 500 g/l of $Ni(NO_3)_2 \times 6H_2O$ and 30 g/l of $Co(NO_3)_2 \times 6H_2O$ in dilute nitric acid solution. The pH was 2 to 3.

A direct voltage was then applied to both electrodes and symmetrically reversed every 20 seconds. The current density was 10 $A/dm^2$ and the temperature 90° C. The bath was agitated during the electrolysis and kept constant in composition. The time of impregnation was 5 hours. Deposition of the active nickel hydroxide mass proceeded rapidly, and a certain amount of metallic nickel from the sintered layer was also converted into nickel hydroxide.

Other additives which, like cobalt nitrate, influence the composition of the active mass may be added to the bath, e.g., magnesium nitrate and lithium nitrate. Yet other additives serve to influence the process of electrolysis. Thus halides, for example chloride ions, may be added as depassivating ions in quantities of about 1 to 5 g/l, e.g., in the form of potassium chloride. Sulphate and persulphate ions also show a depassivating effect. Hydrogen peroxide may also be added to the bath; this causes darkening of the color of the electrolytic bath, presumably due to the oxidation of nickel to $Ni^{3+}$. Such an addition of hydrogen peroxide has an advantageous effect on the activity of impregnation.

EXAMPLE 2

Nickel electrodes were produced by mixing in Mond nickel powder with the reaction mixture for a heat stable, duroplastic synthetic foam and foaming the mixture up round support plates of expanded nickel metal so that the plates were covered with foam in a total thickness of 15 to 20 mm. After hardening, the foam articles were first subjected to a pyrolysis above the decomposition temperature of the foam and immediately thereafter sintered at 950° C in a reducing protective gas atmosphere. The crude electrodes obtained were slightly compacted by compression.

When the edges had been cut down to the required final dimensions, two of the crude electrodes produced in this way were activated by immersion in an electrolytic bath which contained nickel nitrate at a concentration of 2 mol per liter and cobalt nitrate at a concentration of 0.2 mol per liter and which was adjusted to pH 2. The two electrodes were connected to a source of pulsating direct voltage so that the direction of the current was reversed every 8 seconds. Electrolysis was carried out at a current density of 20 $A/dm^2$ at a temperature of 85° C for 5 hours. The two electrodes were then neutralized and subjected to an additional activation by 1 hours immersion in a 2 molar ammonium persulphate solution. When the electrodes were weighed, it was found that impregnation resulted in a smaller increase in weight than corresponds to the quantity of nickel hydroxide deposited. This is due to the fact that nickel from the sintered structure had been electrolytically converted into nickel hydroxide. The composition of the bath could easily be kept constant during electrolysis. Virtually no correction of the pH was necessary.

EXAMPLE 3

An electrochemical impregnation of porous nickel support structures is carried out by means of current impulses of alternating polarity.

The structures consist in the present case of sintered nickel plates having a porosity of 88% and measuring 90 × 60 × 2 mm.

Two such nickel plates were in each case placed parallel to each other at a distance apart of 3 cm in an electrolytic bath consisting of an aqueous solution having the following composition: 2 molar $Ni(NO_3)_2$ and 0.2 molar $Co(NO_3)_2$.

The electrolytic bath is at a temperature of 85° C and has a constant pH of 5.5 during electrolysis.

For electrochemical impregnation, the two nickel plates are connected to a source of current which produces a direct current in the form of rectangular current impulses of alternating sign, each having a current density of 20 $A/dm^2$ and a duration of 15 seconds.

Impregnation is carried out for 6 hours, using direct current under the conditions indicated above.

The electrochemically deposited quantity of $Ni(OH)_2$ is in this case 21.6 g per electrode. The electrode capacity which was afterwards measured corresponds to 6.3 Ah.

EXAMPLE 4

Electrochemical impregnation is carried out by a method similar to that described in Example 3, using similar support structures and an electrolytic bath having the same composition.

In this case, however, the rectangular current impulses have a current density of 25 $A/dm^2$ and a duration of 8 seconds, and electrochemical impregnation is carried out for 4 hours.

The quantity of $Ni(OH)_2$ deposited in this case is 10.4 g per electrode, the total capacity of each electrode then corresponding to 3.03 Ah.

EXAMPLE 5

Electrochemical impregnation is carried out by a method similar to that described in Example 3, using similar support structures similarly arranged in an electrolytic bath of the same composition and supplied with a direct current consisting of alternating current impulses each having a duration of 8 seconds, as in Example 4.

In this case, however, the current density of the current impulses is 50 $A/dm^2$ and impregnation is carried out for 5 hours.

The quantity of $Ni(OH)_2$ deposited is in this case 16.15 g per electrode, the total capacity measured of each electrode then corresponding to 4.7 Ah.

EXAMPLE 6

Electrochemical impregnation of similar carrier structures is carried out in the same way as described in Example 3.

In this case, however, 30 g/liter of KCl is added to the electrolytic bath of the same composition as that indicated in Example 3. Moreover, the current density of the alternating current impulses is in this case 15 A/dm$^2$ and their duration is 90 seconds, and electrochemical impregnation is carried out for 3 hours.

The quantity of Ni(OH)$_2$ deposited is in this case 9 g per electrode, the total capacity of each electrode then corresponding to 2.95 Ah.

We claim:

1. A process for the manufacture of electrodes suitable for electrolytic cells which comprises impregnating a porous matrix structure consisting of an electrode metal with an oxide or hydroxide of the metal by galvanic activation in a bath containing a salt of the metal, in neutral to acid solution, in which at least two porous metal matrix electrodes are placed into the bath and both are impregnated at the same time by applying one terminal of a direct voltage to each electrode and reversing the polarity of the direct voltage at a pulsating frequency, the reversal of polarity taking place at intervals ranging from 4 seconds up to 3 minutes and the metal necessary for impregnation of the electrodes is supplied substantially by the electrode metal.

2. A process as claimed in claim 1 in which the metal is nickel.

3. A process as claimed in claim 1 in which the salt of the metal is the nitrate.

4. A process as claimed in claim 1 in which only electrodes of the kind which are themselves activated in the form of porous metal matrix electrodes are placed into the bath.

5. A process as claimed in claim 1 in which reversal of the polarity takes place at symmetric time intervals so that in each electrode, the duration of the cathodic current load and the duration of the anodic current load during impregnation are equally long.

6. A process as claimed in claim 1 in which the reversal is effected at least every 60 seconds.

7. A process as claimed in claim 1 in which the reversal is carried out every 4 to 45 seconds.

8. A process as claimed in claim 1 in which the porous metal matrix electrodes are put into the process in a denser state than that which corresponds to the desired metal structure for the finished electrode.

9. A process as claimed in claim 1 in which the current density during impregnation is maintained between about 5 and 50 A/dm$^2$.

10. A process as claimed in claim 9 in which the current density is maintained between 5 and 30 A/dm$^2$.

11. A process as claimed in claim 9 in which the current density is maintained between 5 and 15 A/dm$^2$.

12. A process as claimed in claim 10 in which the current density is maintained between 15 and 30 A/dm$^2$.

13. A process as claimed in claim 1 in which the impregnation is carried out for a period of from 4 to 6 hours.

14. A process as claimed in claim 1 in which the impregnation is carried out at pH values of between 1 and 6.

15. A process as claimed in claim 14 in which the impregnation is carried out at a pH value of from 3 to 5.5.

16. A process as claimed in claim 1 in which during impregnation, the bath is maintained at a temperature of between 50 and 100° C.

17. A process as claimed in claim 16 in which the bath is maintained at a temperature of between 75 and 95° C.

18. A process as claimed in claim 1 in which the bath is continuously agitated and is regenerated and filtered outside the container for the bath.

19. A process as claimed in claim 1 in which after the galvanic impregnation, the porous nickel electrodes are additionally activated by ca.1 hour's immersion in an approximately 2 molar ammonium persulfate solution at room temperature.

20. A process for the manufacture of electrodes suitable for electrolytic cells which comprises impregnating a porous matrix consisting of an electrode metal with an oxide or hydroxide of the metal by galvanic activation in a bath containing a nitrate of the metal in a neutral or acid solution in which at least two porous metal matrix electrodes are placed in the bath and both are impregnated at the same time by applying one terminal of a direct voltage to each electrode and reversing the polarity of the direct voltage at a pulsating frequency, the reversal of the polarity taking place at equal intervals ranging from 4 seconds up to 3 minutes, a current density of from 5 to 50 A/dm$^2$ being used, with an impregnation time of 4 to 6 hours at a bath temperature from 50° C to 100° C and a pH of from 3 to 5.5 and the metal necessary for impregnation of the electrodes is supplied substantially by the electrode metal.

21. A process as claimed in claim 20 in which several electrodes are impregnated in pairs simultaneously in the bath.

22. A proces as claimed in claim 20 in which the composition of the bath and the conditions of electrolysis are adjusted to favor discharge of oxygen over removal of metal at whichever electrode is connected as anode at the time.

23. A process as claimed in claim 20 in which hydrogen peroxide is added to the bath.

24. A process as claimed in claim 23 in which the hydrogen peroxide is added as perhydrol.

25. A process as claimed in claim 20 in which about 2 to 10% of magnesium nitrate, based on the weight of the bath, are added to the bath.

26. A process as claimed in claim 25 in which 3 to 5% of magnesium nitrate are added.

27. A process as claimed in claim 25 in which about 2 to 5 g of lithium nitrate per liter of bath are added to the bath.

28. A process as claimed in claim 20 in which depassivating anions of mineral acids are added to the bath.

29. A process as claimed in claim 28 in which chlorides, sulphates or persulphates are added as depassivating ions in amounts of from 1 to 5 g/liter.

30. A process for the production of positive nickel hydroxide electrodes according to claim 20, wherein said metal is nickel.

* * * * *

UNITED STATES PATENT OFFICE
CERTIFICATE OF CORRECTION

Patent No. 4,132,606　　　　　　　　　　Dated January 2, 1979

Inventor(s) Crespy et al.

It is certified that error appears in the above-identified patent and that said Letters Patent are hereby corrected as shown below:

Column 3, line 27, after "during" delete --the--;
Column 5, line 61, "claim 10" should read --claim 9--;
Column 6, line 34, "from" (first occurrence) should read --of from--;
Column 6, line 40, "proces" should read --process--.

Signed and Sealed this

Fifth Day of June 1979

[SEAL]

*Attest:*

RUTH C. MASON
*Attesting Officer*

DONALD W. BANNER
*Commissioner of Patents and Trademarks*